United States Patent [19]

Mancosu

[11] 4,280,484
[45] Jul. 28, 1981

[54] SOLAR ROOFS

[75] Inventor: Federico Mancosu, Milan, Italy

[73] Assignee: Industrie Pirelli S.p.A., Milan, Italy

[21] Appl. No.: 81,457

[22] Filed: Oct. 3, 1979

[30] Foreign Application Priority Data

Oct. 4, 1978 [IT] Italy ................. 28392 A/78

[51] Int. Cl.³ .............. F24J 3/02; F28F 7/00; E04B 1/62
[52] U.S. Cl. ..................... 126/450; 52/397; 52/476; 52/506; 126/448; 165/76; 165/81
[58] Field of Search .......... 126/417, 450, 901, 448; 285/45; 52/475, 476, 397, 506, 509, 199, 200; 165/76, 79, 67, 81, 82, 83

[56] References Cited

U.S. PATENT DOCUMENTS

| 4,051,833 | 10/1977 | Vandament | 126/450 |
|---|---|---|---|
| 4,073,283 | 2/1978 | Lof | 126/450 |
| 4,108,155 | 8/1978 | Koizumi et al. | 126/450 |
| 4,119,083 | 10/1978 | Heyen et al. | 126/449 |
| 4,123,883 | 11/1978 | Barber et al. | 126/901 |
| 4,136,669 | 1/1979 | Lane | 126/450 |
| 4,138,989 | 2/1979 | Doyle et al. | 126/450 |
| 4,159,017 | 6/1979 | Novi | 126/901 |
| 4,184,481 | 1/1980 | Tornquist | 126/450 |

Primary Examiner—Daniel J. O'Connor
Attorney, Agent, or Firm—Stevens, Davis, Miller & Mosher

[57] ABSTRACT

A solar roof for a building which is transparent to sunlight and protects the building from weather has a synthetic resinous thermal insulating pad disposed on a rigid substrate which closes the top of the building. Laterally spaced plate members are disposed on the pad. Each plate member has conduits therein for carrying a fluid to be heated by solar energy. Means are provided for circulating fluid through the conduits and to a vessel for storing the fluid after it is heated. A generally U-shaped support member having a closed bottom which rests on the pad is disposed in each space between the plate members. The two upstanding legs of the support member terminate in ends having longitudinally extending flanges. A sheet transparent to solar energy is disposed on the flanges and seals the spaces between adjacent U-shaped support members.

6 Claims, 2 Drawing Figures

SOLAR ROOFS

This invention relates to a solar roof, i.e., to a top covering for a building or the like which not only provides a waterproof covering for the building but also transforms solar energy into usable energy.

Solar roofs are known. The known solar roofs however, have two different elements, separated one from the other, with one element providing waterproofing and the other transforming incident sun energy into useful heat or the like. Consequently, the known solar roofs are very heavy and require very strong and expensive supporting structures. Another disadvantage of the known solar roofs is that the efficiency of the transformation from solar energy into useful energy which can be transported is very unsatisfactory because of the structure of the solar roof, since the structure is such that only a part of the roof surface can be used to transform the incident sun energy into transportable energy.

It is an object of this invention to provide a solar roof which does not have the aforesaid drawbacks of the known solar roofs. Another object of the invention is to provide a solar roof which is light in weight and is adapted to transform solar energy into transportable and useful energy.

Other objects of the invention will become apparent from the following description with reference to the accompanying drawing wherein.

The foregoing objects and others are accomplished in accordance with the invention generally speaking, by providing a solar roof having a continuous sheet of thermal-insulating material and a plurality of sheets of material which are transparent to sunlight above the continuous sheet and are connected thereto by means of spacers to provide air spaces in which plates provided with fluid passageways are disposed, and with means for flowing and collecting the circulating fluid in the passageways.

Figure 1:
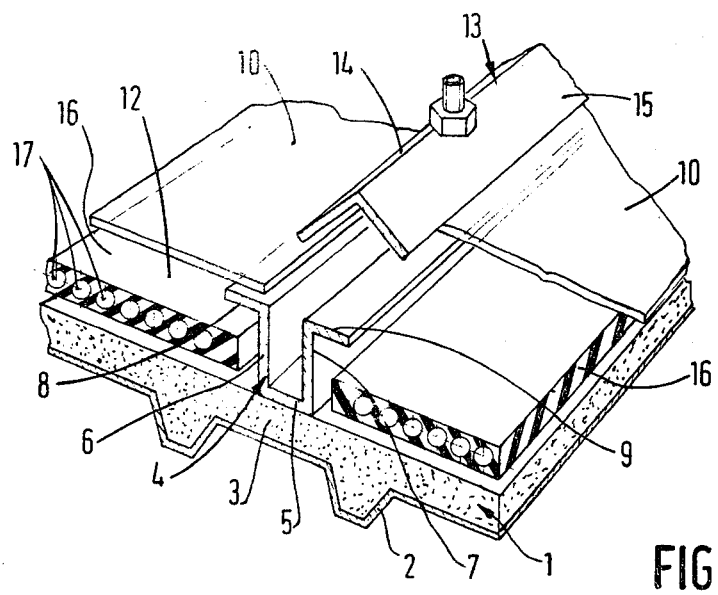
FIG. 1 is a perspective view of a roof pitch.
Figure 2:
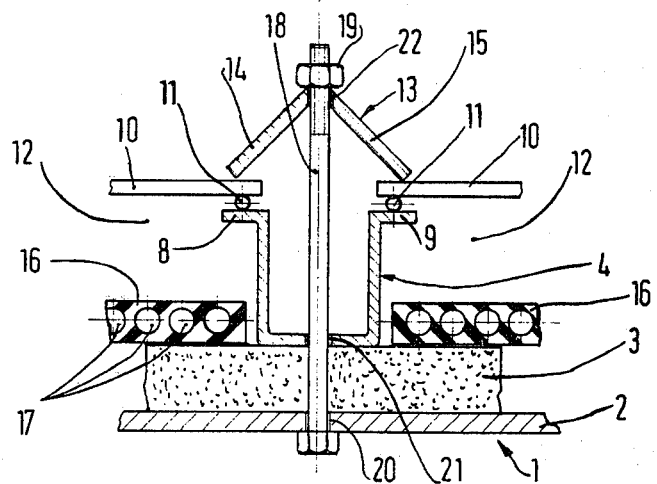
FIG. 2 is an enlarged cross section of the embodiment of FIG. 1.

Referring now to the drawing, one embodiment of a solar roof is illustrated in FIGS. 1 and 2. In this embodiment, a single continuous sheet 1 covers the whole roof. It is supported above one of the usual and known per se supporting framework of a roof.

The sheet 1 is a sheet of thermal-insulating material having a rolled section formed by a rigid corrugated sheet metal combined with a layer 3 of rigid polyurethane foam insulation.

On the sheet 1 and fastened to it through means described later, are a plurality of spaced trough-like members 4, having a generally U-shaped cross-section. Members 4 are of rigid metallic material and are equally spaced so as to be perpendicular both to the roof gutter line and to the top line of the roof.

Each member 4 has a flat bottom 5 by means of which member 4 is disposed on the sheet 1 of thermo-insulating material and two upstanding walls 6 and 7. Bottom 5 and walls 6 and 7 define a rectangular cavity open at its end opposite bottom 5.

At the ends of the walls 6 and 7 the U-shaped profile member 4 has two fins or flanges 8 and 9, which lie on a plane parallel to the plane of the bottom 5 of the U-shaped member 4.

Sheets 10 of a material which is transparent to sunlight are supported by their end edges on each of flanges 8 and 9. An elastomeric sealing member or gasket 11 is disposed between each sheet 10 and the underlying flange 8 or 9. In this way, between each sheet 10 and continuous sheet 1, an air space is formed.

An inverted L-shaped peak member 13 (L-shaped in cross-section) is arranged on each U-shaped member 4, that is, the L-shaped member 13 is arranged so that the right angle formed by the connection of the members 14 and 15, is turned towards the cavity of the U-shaped member 4.

In this way, member 13 is disposed with the ends of members 14 and 15 against the sheets 10 and presses on them through means, described later on, by which member 13 is connected to member 4.

Black elastomeric plates 16 are disposed in air spaces 12. Plates 16 are provided with through cavities or passages 17 for fluid flow. The fluid is heated by the incident solar radiations which pass through the transparent sheets 10.

The movement and the collection of the fluid in and through cavities 17 of the plates 16 are made by means of terminals, connected to plates 16 at the top line of the roof and at the roof gutter line.

As previously stated, the solar roof of the present invention is provided with means for connecting the U-shaped members 4 to sheet 1 and the L-shaped member 13 to U-shaped member 4.

The described connecting means are shown on an enlarged scale in FIG. 2.

As shown in FIG. 2, the connecting means has bolts 18 with nuts 19 and a set of aligned holes 20, 21 and 22 in sheet 1, in bottom 5, member 4 and at the corner of the L-shaped member 13.

The bolts 18 are inserted in the set of holes 20, 21 and 22 and the nuts 19 are screwed on the ends 23 of the bolts 18.

From the description, it is clear that the objects of the invention are achieved.

As a matter of fact, in the particular structure of the solar roof of the invention, the elements necessary for transforming the solar energy into energy transportable over a distance are utilized in such a way as to provide a covering having large dimensions and which is completely impervious to the atmosphere.

Because the elements necessary for the transformation of the solar energy carry out a double function, it is possible to provide a very light covering and, consequently, the supporting structures need not be very heavy or expensive.

Moreover, since the covering element of the roof is constituted entirely by the elements necessary for transforming the incident solar energy, a highly efficient structure is provided for the transformation of energy since the whole roof surface serves this function.

Although a particular embodiment of the invention has been illustrated and described, it is to be understood that variations can be made therein by those skilled in the art without departing from the spirit and scope of the invention except as it is limited by the claims.

What is claimed:

1. A solar roof comprising a rigid metal sheet doubled to a continuous layer of thermoinsulating foamed resin material, laterally spaced elastomeric plates disposed on said foamed resin for directing fluid therethrough, a plurality of spacer members parallel one to the other laid onto the thermoinsulating material, said spacer members having outwardly extending flanges thereon a plurality of light transparent sheets having their edges resting on said flanges of the spacer members and peak shaped profiles disposed above and retaining the edges of adjacent light transparent sheets leaning on the same spacer member, said peak shaped profiles being connected and linked to the rigid metal sheet with the interposition of the layer of thermoinsulating material by means of tie rods whereby said spacer members can deform without imparting localized stresses to the light transparent sheet.

2. The solar roof of claim 1, wherein said spacer members are U-shaped in cross-section and have side members with laterally extending flanges integral therewith, each flange extending outwardly from its supporting side member and disposed parallel to the bottom of the U-shaped member, and wherein means are provided for connecting the bottoms of the U-shaped members to the sheet of thermo-insulating material, and means are provided for tightly connecting the said sheets to said flanges.

3. The solar roof of claim 2, wherein the means for tightly connecting the sheets of material transparent to the sunlight to the said flanges have an inverted L-shaped cross-section arranged like a roof on the groove of the U-shaped member with the ends of its sides in contact with the sheets of material transparent to the sunlight, a seal member is placed between the flanges and said sheets, and means are provided for pressing the sheets against the U-shaped member.

4. The solar roof of claim 3, wherein the means for pressing the L-shaped member against the said sheets comprise threaded rods fixed at one of their ends to the bottom of the U-shaped member through holes in the L-shaped member by threaded rods and bolts fixed to the rods.

5. The solar roof of claim 1, wherein the continuous sheet of thermo-insulating material is a rolled section constituted by a layer of corrugated sheet metal and by a layer of foamed resin having an undulated surface of complementary shape to that of the sheet metal.

6. A solar roof for a building comprising from adjacent to the building upwardly a rigid sheet which covers the said building, an insulating foam resin pad disposed face to face on the rigid sheet, laterally spaced elastomeric plates disposed on the said foam resin pad face to face, a conduit means embedded in said plates for flow of fluid therethrough, means for flowing a fluid through said fluid conduit means, laterally spaced support members having a base disposed on the said foam resin pad between said spaced elastomeric plates, laterally spaced walls upstanding from the said base and fixed thereto, said upstanding walls terminating above said base in ends having outwardly extending flanges which lie in a plane substantially parallel to the plane of the said base, light transparent sheets disposed along one edge thereon on said flanges and disposed above the said insulating pad with an air space between said transparent sheet and said insulating pad, a peak member above said light transparent sheets and covering the space therebetween, and means for securing the said peak member to the said rigid sheet with the foam resin pad therebetween, whereby the said laterally spaced support members can deform without imparting localized stresses to said light transparent sheets.

* * * * *